UNITED STATES PATENT OFFICE.

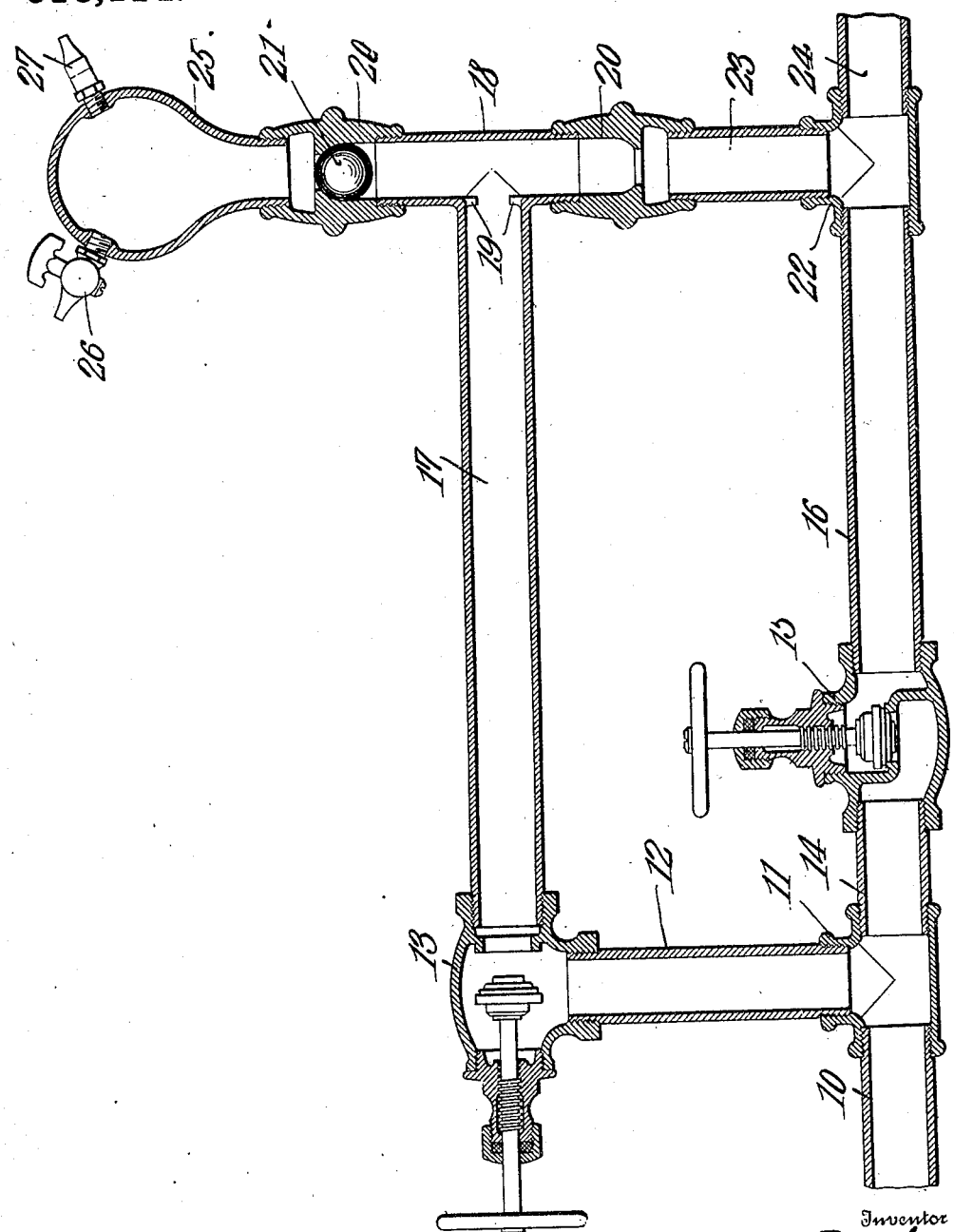

REX DAVIS, OF SALEM, WEST VIRGINIA.

FLUID-PRESSURE CUT-OFF.

No. 916,114.　　　　Specification of Letters Patent.　　Patented March 23, 1909.

Application filed May 26, 1908. Serial No. 435,075.

*To all whom it may concern:*

Be it known that I, REX DAVIS, a citizen of the United States, residing at Salem, in the county of Harrison and State of West Virginia, have invented a new and useful Fluid-Pressure Cut-Off, of which the following is a specification.

This invention relates to fluid pressure cut-offs such as are used in gas lines to automatically close the supply pipe when the pressure falls below a predetermined point.

The object of the invention is to provide an improved form of such cut-off which shall be free from multiplicity of parts and simple and easy of construction, and positive in operation.

The invention consists in a valve casing having a pair of valve seats with a common valve, the position of the valve on one of the seats closing the fluid pressure supply line, and the position of the valve on the other seat closing and opening connection to the atmosphere, together with certain other novel features of construction and combinations of parts hereinafter fully described, illustrated in the accompanying drawings, and specifically set forth in the claims.

In the accompanying drawings, reference characters are used to indicate the various parts, and the view is a longitudinal section taken on the median plane of the device.

In the form of the device here illustrated the pipe leading from the main is indicated by the numeral 10. On this is fitted a tee 11. A branch pipe 12 is fitted in the tee. A globe valve 13 is carried on the branch pipe 12 the same being preferably an angle globe in the device under present consideration. To the other outlet of the tee 11 is fitted a pipe 14 which carries a straight line globe valve 15, to which in turn is fitted a pipe 16.

For the purposes of this device I use a special tee the stem of which is indicated at 17 connected to the globe valve 13 and the cross portion at 18. These two portions are preferably made equal in cross-sectional area and in order to accomplish an object hereinafter to be described a plurality of fingers 19 are provided between the two portions. Mounted upon each end of the tee 18 is a ball valve seat 20 arranged to coact with a ball valve 21.

The pipe 16 has fitted thereon a tee 22 which is connected to the lower valve seat fitting 20 by a pipe 23. A pipe 24 leads from the tee 22 and pipe 23 to the supply pipe for the gas or other burners. Mounted upon the end of the upper ball valve fitting is an expansion chamber 25 which is provided with a pet-cock 26 opening to the atmosphere. On this expansion chamber there is also provided an automatic valve 27 arranged to close when the pressure within the chamber 25 becomes greater than that of the atmosphere. It is to be observed that different varieties of balls 21 may be used for this purpose and that the same will depend largely on the degree of pressure retained within the piston. That is to say the weight of the ball valve 21 will be in direct ratio to the degree of pressure maintained.

In order to understand the operation of the device let it be supposed that the same is connected to the gas line of a house. In the normal course of operation, that is to say when the gas is flowing freely through the pipe and the pressure is of the required degree, the gas will pass through the pipe 10, tee 11 pipe 12, valve 13, and the special tee 17 and 18 forming the ball valve casing. From there it passes to the ball valve fitting 20 at the lower end of the body of the special tee into the pipe 23 through the tee 22, into the pipe 24, and from there it passes to the burner. When the parts are in this condition the ball will be held in the upper ball valve seat as indicated in the figure. During the flow of the gas in this manner the valve 15 will be closed and the valve 13 opened. The petcock 26 will also be closed while the valve 27 will be opened to the atmosphere if the pressure in the expansion chamber 25 is not greater than the atmospheric pressure. Now let it be assumed that the pressure in the line drops below that at which the device is intended to maintain it. The ball valve 21 will then fall from its upper seat and position in the lower seat. This will cut off all supply of gas to the lighting burners and the parts will remain in this condition until properly attended to. When it is discovered that the lights are out the person in charge of them first turns off all the burners that have been lighted, he then closes the valve 13 and opens the pet-cock 26. The valve 15 is then opened and the gas passes through the pipes 10, 14, 16 and 24, a portion of the pressure being exerted through the pipe 23. This last mentioned portion raises the ball valve 21 to its upper seat as shown in the figure. The petcock 26 is then closed and if the pressure be sufficient the ball valve will remain in that seat. If the ball valve remains in the upper seat the attendant opens the valve 13 and closes valve, 15 thus establishing the relation of the parts in the same manner as shown in the figure. It is to be observed that the ball valve 21 is prevented from entering the portion 17 of the special tee forming the valve casing by means of the fingers 19. Were it not for these fingers the ball valve might roll into the portion 17 and thus render the device inoperative.

There has thus been provided a simple and efficient device of the character described.

It is to be noted that this device may be made almost entirely of stock parts and that the valve therein used is of very simple construction having but the one moving part, that is to say the ball.

Having thus described the invention what is claimed as new, is:—

1. In a device of the character described, a valve casing, a pair of valve seats inwardly facing and positioned one above the other, a valve arranged to position on either of said seats, a pipe opening into said casing between said seats, a second pipe leading from the lower valve seat, an expansion chamber in communication with the atmosphere and the upper valve seat, a manually operable valve between the said chamber and the atmosphere, and a check valve held therein in communication with the atmosphere.

2. In a device of the character described, a valve casing, a pair of valve seats, a valve arranged to position on either of said seats, a pipe opening into said casing between said seats, a second pipe leading from said casing the opening of which is closed by one position of the valve, a connection to the atmosphere the opening to which is closed by a second position of said valve, and a third pipe connecting the first and second mentioned pipes and provided with a valve.

3. In a device of the character described, a valve casing, a ball valve, a pair of seats therefor in said casing, a valved pipe opening into said casing between said ball valve seats, a second pipe leading from said casing the opening to which is closed by one position of the ball valve, a connection between said casing and the atmosphere the opening to which is closed by a second position of said ball valve, and a third pipe provided with a valve and connecting the first and second mentioned pipes, the connection to the first pipe being anterior to the position of the valve in that pipe.

4. In a device of the character described, a valve casing, a ball valve, a pair of seats therefor in said casing, a valved pipe opening into said casing between said ball valve seats, a second pipe leading from said casing the opening to which is closed by one position of the ball valve, an expansion chamber connected to said valve casing the opening to which is closed by a second position of said ball valve, a pet-cock and check-valve connected to said expansion chamber and affording communication with the atmosphere, and a third pipe provided with a valve connecting the first and second mentioned pipes, the point of connection with the first pipe being anterior to the valve in that pipe.

In testimony that I claim the foregoing as my own, I have hereto affixed my signature in the presence of two witnesses.

REX DAVIS.

Witnesses:
R. C. DAVIS,
WM. HYEL.